(12) United States Patent
Higashino et al.

(10) Patent No.: US 9,764,356 B2
(45) Date of Patent: *Sep. 19, 2017

(54) ACCELERATION SENSATION PRESENTATION APPARATUS, ACCELERATION SENSATION PRESENTATION METHOD, AND ACCELERATION SENSATION PRESENTATION SYSTEM

(71) Applicant: SONY CORPORATION, Tokyo (JP)

(72) Inventors: Satoru Higashino, Tokyo (JP);
Toshihiro Horigome, Kanagawa (JP);
Akira Suzuki, Kanagawa (JP);
Naofumi Goto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/278,123

(22) Filed: Sep. 28, 2016

(65) Prior Publication Data

US 2017/0018151 A1  Jan. 19, 2017

Related U.S. Application Data

(63) Continuation of application No. 14/197,245, filed on Mar. 5, 2014.

(30) Foreign Application Priority Data

Mar. 15, 2013  (JP) .................. 2013-053408

(51) Int. Cl.
*B06B 1/16* (2006.01)
*G06F 1/16* (2006.01)
*G08B 6/00* (2006.01)

(52) U.S. Cl.
CPC ................ *B06B 1/16* (2013.01); *G06F 1/163* (2013.01); *G06F 1/1654* (2013.01); *G06F 1/1688* (2013.01); *G06F 1/1694* (2013.01); *G08B 6/00* (2013.01)

(58) Field of Classification Search
CPC ......... B06B 1/16; G06F 1/163; G06F 1/1654; G06F 1/1688; G06F 1/1694; G06B 6/00
USPC ....................................... 434/365
See application file for complete search history.

(56) References Cited

FOREIGN PATENT DOCUMENTS

JP  2010-026865 A  2/2010

*Primary Examiner* — Robert J Utama
*Assistant Examiner* — Robert P Bullington
(74) *Attorney, Agent, or Firm* — Chip Law Group

(57) ABSTRACT

An acceleration sensation presentation apparatus includes: a frame to be worn on the head of a user; at least one or more weights provided to the frame; and a vibration driving unit configured to vibrate the weight to be moved.

18 Claims, 9 Drawing Sheets

ACCELERATION SENSATION PRESENTATION APPARATUS, ACCELERATION SENSATION PRESENTATION METHOD, AND ACCELERATION SENSATION PRESENTATION SYSTEM

CROSS REFERENCE TO RELATED APPLICATIONS

The present application is a continuation application of U.S. patent application Ser. No. 14/197,245 filed May 3, 2014, which claims the benefit of Japanese Priority Patent Application JP 2013-053408 filed Mar. 15, 2013, the entire contents of which are incorporated herein by reference.

BACKGROUND

The present disclosure relates to an acceleration sensation presentation apparatus, an acceleration sensation presentation method, and an acceleration sensation presentation system.

There has been proposed a device configured to present acceleration sensation to a user by optionally changing the center of gravity of a headgear-type device worn on the head of the user (see Japanese Unexamined Patent Application Publication No. 2010-26865).

SUMMARY

Though an acceleration sensation may be provided to a user using the device according to Japanese Unexamined Patent Application Publication No. 2010-26865, it is desirable to present an acceleration sensation to a user more clearly.

Accordingly, it has been found to be desirable to provide an acceleration sensation presentation apparatus, an acceleration sensation presentation method, and an acceleration sensation presentation system, which present an acceleration sensation to a user more clearly in comparison with devices proposed heretofore.

According to an embodiment of the present disclosure, an acceleration sensation presentation apparatus includes: a frame to be worn on the head of a user; at least one or more weights provided to the frame; and a vibration driving unit configured to vibrate the weight to be moved.

An embodiment of the present disclosure is an acceleration sensation presentation method of an acceleration sensation presentation apparatus which is provided to a frame to be worn on the head of a user, wherein at least one or more weights to be moved are vibrated.

According to an embodiment of the present disclosure, an acceleration sensation presentation system includes: an external device configured to output acceleration information in a synchronized manner with a predetermined video signal and a predetermined audio signal; and an acceleration sensation presentation apparatus configured to obtain the acceleration information. The acceleration sensation presentation apparatus includes a frame to be worn on the head of a user, at least one or more weights provided to the frame, and a vibration driving unit configured to vibrate the weight to be moved, based on the acceleration information.

According to the above configurations, an acceleration sensation enables to be presented to a user more clearly in comparison with devices proposed heretofore.

DETAILED DESCRIPTION OF EMBODIMENTS

Hereinafter, embodiments of the present disclosure will be described with reference to the drawings. Note that description will be made in accordance with the following order.

1. First Embodiment
2. Second Embodiment
3. Modifications

Embodiments and others to be described below are preferred specific examples of the present disclosure, and contents of the present disclosure are not restricted to these embodiments and others.

1. First Embodiment

Overview of Acceleration Sensation Presentation Apparatus

One feature of acceleration sensation presentation apparatuses according to embodiments and so forth of the present disclosure is to present an acceleration sensation to a user using a headgear-type device alone. This differs from devices using large-scale and expensive stages installed in game arcades and recreation halls and so forth. First, an overview of an acceleration sensation presentation apparatus according to an embodiment will be described.

The acceleration sensation presentation apparatus according to an embodiment of the present disclosure is a headgear-type apparatus. A user is enabled to experience virtual reality by wearing the present apparatus on the head. One or more movable weights with a predetermined weight are provided to the acceleration sensation presentation apparatus.

The center of gravity of the acceleration sensation presentation apparatus itself can be changed by moving the position of this weight. As a result of this, predetermined force is applied to the user's head wearing the acceleration sensation presentation apparatus in a predetermined direction. Specifically, the acceleration sensation presentation apparatus moves the position of the weight to change the center of gravity of the apparatus itself, and applies predetermined force to the user in a predetermined direction. Thus, the acceleration sensation presentation apparatus can provide an acceleration sensation to the user.

Further, the acceleration sensation presentation apparatus according to an embodiment of the present disclosure vibrates the weight. As a result of this, vibration from vibration of the weight is applied to the user's head wearing the acceleration sensation presentation apparatus. Specifically, vibration is applied to the user's head in addition to the predetermined force from the weight. Thus, an acceleration sensation may be presented to the user more clearly.

Figure 1:
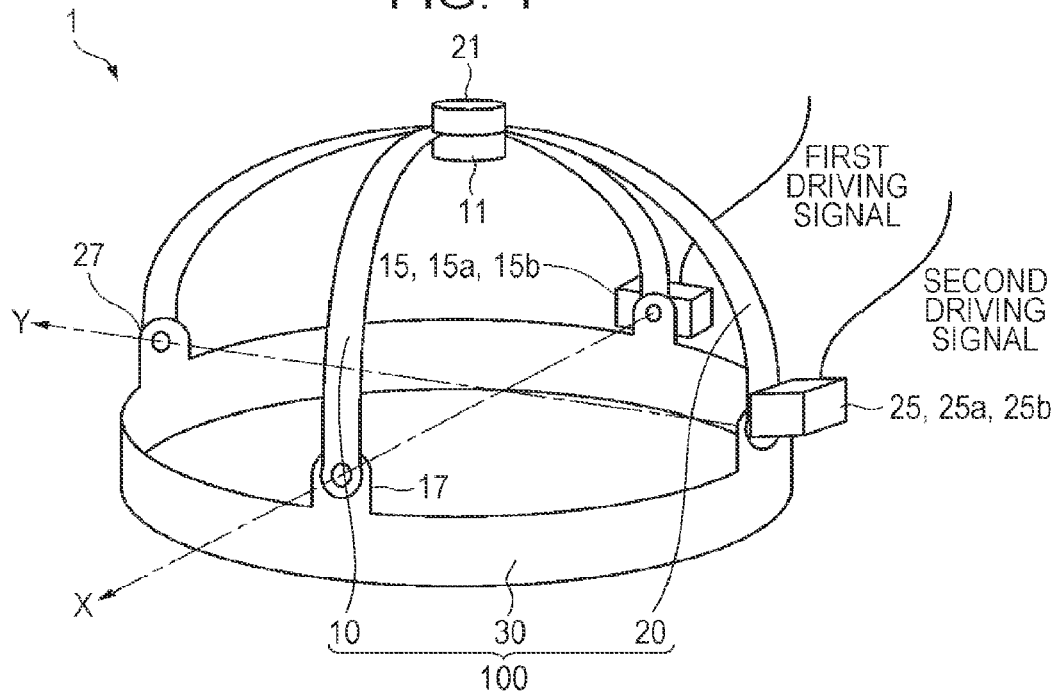
FIG. 1 is a diagram illustrating an example of an overall configuration of an acceleration sensation presentation apparatus according to a first embodiment.

Configuration of Acceleration Sensation Presentation Apparatus According to First Embodiment First, an example of the overall configuration of an acceleration sensation presentation apparatus according to the first embodiment will be described. FIG. 1 schematically illustrates an example of the overall configuration of an acceleration sensation presentation apparatus 1 according to the first embodiment.

An example of the acceleration sensation presentation apparatus 1 is a headgear-type apparatus to be worn on the head of a human (user). The acceleration sensation presentation apparatus 1 includes, for example, a first turning frame 10, a second turning frame 20, a base frame 30, a first weight 11, a second weight 21, a first driving unit 15, and a second driving unit 25. A frame 100 is configured of the first turning frame 10, second turning frame 20, and base frame 30, for example.

Though details are not illustrated, the first driving unit 15 includes a first movement driving unit 15a configured to turn the first turning frame 10, and a first vibration driving unit 15b configured to vibrate the first weight 11 by vibrating the first turning frame 10. The second driving unit 25 includes a second movement driving unit 25a configured to turn the second turning frame 20, and a second vibration driving unit 25b configured to vibrate the second weight 21 by vibrating the second turning frame 20. Hereinafter, the components of the acceleration sensation presentation apparatus 1 will be described in detail.

The base frame 30 is formed, for example, in a generally circular shape so as to surround at least part of the user's head. A pair of first fixing portions 17 configured to turnably fix the first turning frame 10 are concentrically formed above the base frame 30. Also, a pair of second fixing portions 27 configured to turnably fix the second turning frame 20 are concentrically formed above the base frame 30.

An axis upon which the pair of first fixing portions 17 is formed extends in the forward and backward direction of a wearer. This axis will be referred to as X axis in the following description in the embodiments as appropriate. An axis upon which the pair of second fixing portions 27 is formed extends in the horizontal direction of the wearer, orthogonal to the X axis. This axis will be referred to as Y axis in the following description in the embodiments as appropriate. The X axis may also be referred to as a "first direction", and the Y axis may also be referred to as a "second direction". It goes without saying that the X axis and Y axis are described here for convenience of description, and the contents of the present disclosure are not restricted to these. Specifically, the first direction may be set to an optional radial direction of the base frame 30, and in this case, the second direction may be a direction orthogonal to the first direction.

The first turning frame 10 is formed, for example, in an arc shape so that a plate-shaped member covers the user's head. The first turning frame 10 is turnably fixed to the first fixing portions 17 formed on the X axis of the base frame 30. The first turning frame 10 can be turned on the X axis as the center, under driving control by the first movement driving unit 15a. The first weight 11 having a predetermined weight is fixed to one side of the top portion of the first turning frame 10. Accordingly, the first turning frame 10 is turned by the first movement driving unit 15a on the X axis as the center. Thus, the first weight 11 fixed to the first turning frame 10 is also moved. As a result of this, the center of gravity of the entire frame 100 is changed. The first weight 11 is fixed to the lower face of the top portion of the first turning frame 10 in the example of the acceleration sensation presentation apparatus 1 illustrated in FIG. 1. However, the position of the first weight 11 is not restricted to this, and may be fixed to the upper face of the top portion of the first turning frame 10.

Further, the first turning frame 10 may vibrate at a predetermined amplitude and frequency, under driving control by the first vibration driving unit 15b. Vibration of the first turning frame 10 causes the first weight 11 fixed to the first turning frame 10 to also vibrate.

The second turning frame 20 is formed, for example, in an arc shape so that a plate-shaped member covers the user's head. The second turning frame 20 is turnably fixed to the second fixing portions 27 formed on the Y axis of the base frame 30. The second turning frame 20 can be turned on the Y axis as the center, under driving control by the second movement driving unit 25a. The second weight 21 having a predetermined weight is fixed to one side of the top portion of the second turning frame 20. Accordingly, the second turning frame 20 is turned by the second movement driving unit 25a on the Y axis as the center. Thus, the second weight 21 fixed to the second turning frame 20 is also moved. As a result of this, the center of gravity of the entire frame 100 is changed. The second weight 21 is fixed to the upper face of the top portion of the second turning frame 20 in the example of the acceleration sensation presentation apparatus 1 illustrated in FIG. 1. However, the position of the second weight 21 is not restricted to this, and may be fixed to the lower face of the top portion of the second turning frame 20.

Further, the second turning frame 20 may vibrate at a predetermined amplitude and frequency, under driving control by the second vibration driving unit 25b. Vibration of the second turning frame 20 causes the second weight 21 fixed to the second turning frame 20 to also vibrate.

The frame 100 is preferably formed, for example, by injection molding of plastic or the like to realize reduction in weight of the acceleration sensation presentation apparatus 1 itself. It goes without saying that the material of the frame 100 is not restricted to plastic, and the frame 100 may be formed of a metal plate or the like. Thus, the frame 100 is not restricted to a particular material. Similarly, the first weight 11 and second weight 21 are not restricted to a weight made of a particular material either, as long as the weights are objects with particular weight.

Also, the shapes of the frame 100, first weight 11, and second weight 21 illustrated in FIG. 1 are exemplary, and the frame 100 and others are not restricted to the illustrated shapes. Further, a configuration other than illustrated in FIG. 1 may also be provided. For example, a sheet configured to protect the wearer's head may be attached to the frame 100, or a cushion material may be provided to a portion where the head in the frame 100 is in contact with the frame 100. Also, a mechanism capable of adjusting the size of the diameter of the base frame 30 may be provided to the base frame 30.

The first movement driving unit 15a is a driving motor configured to turn the first turning frame 10 turnably fixed to the first fixing portions 17 on the X axis as the center. For example, there may be employed as the first movement driving unit 15a a servo motor configured to control turning at a predetermined angle according to the first driving signal input. The first movement driving unit 15a is not restricted to a particular motor as long as the motor may control turning at an optional angle according to the first driving signal input.

The first movement driving unit 15a can control turning according to various signals such as a signal programmed beforehand in game software, a signal recorded in a recording medium, a signal obtained by communication via a network, and so forth. Thus, the first movement driving unit 15a can control the first turning frame 10 to turn at an optional angle on the X axis as the center, according to various signals.

The first vibration driving unit 15b is a vibrating motor configured to vibrate the first turning frame 10 turnably fixed to the first fixing portions 17. The first vibration driving unit 15b is not restricted to the vibration motor, and may be a piezoelectric device configured to be displaced according to applied voltage, or the like. The first vibration driving unit 15b controls vibration of the first turning frame 10 according to the first driving signal. The first vibration driving unit 15b is not restricted to a particular motor as long as the motor may control vibration according to the first driving signal input. The first vibration driving unit 15b can control vibration according to various signals such as a signal programmed beforehand in game software, a signal recorded in a recording medium, a signal obtained by communication via a network, and so forth.

Though the first vibration driving unit 15b vibrates the first turning frame 10, thereby vibrating the first weight 11 in the embodiment, the first vibration driving unit 15b may directly vibrate the first weight 11. Also, movement and vibration of the first turning frame 10 may be controlled by a single driving system having the functions of the first movement driving unit 15a and first vibration driving unit 15b. Further, the first turning frame 10 may be vibrated after turning of the first turning frame 10 is completed, or the first turning frame 10 may be vibrated along with turning.

The second movement driving unit 25a is a driving motor configured to turn the second turning frame 20 turnably fixed to the second fixing portions 27 on the X axis as the center. For example, there may be employed a servo motor configured to control turning at a predetermined angle according to the second driving signal input, as the second movement driving unit 25a. The second movement driving unit 25a is not restricted to a particular motor as long as the motor may control turning at an optional angle according to the second driving signal input.

The second movement driving unit 25a can control turning according to various signals such as a signal programmed beforehand in game software, a signal recorded in a recording medium, a signal obtained by communication via a network, and so forth. Thus, the second movement driving unit 25a can control the second turning frame 20 to turn at an optional angle on the X axis as the center, according to various signals.

The second vibration driving unit 25b is a vibrating motor configured to vibrate the second turning frame 20 turnably fixed to the second fixing portions 27. The second vibration driving unit 25b is not restricted to the vibration motor, and may be a piezoelectric device configured to be displaced according to applied voltage, or the like. The second vibration driving unit 25b controls vibration of the second turning frame 20 according to the second driving signal. The second vibration driving unit 25b is not restricted to a particular motor as long as the motor may control vibration according to the second driving signal input. The second vibration driving unit 25b can control vibration according to various signals, such as a signal programmed beforehand in game software, a signal recorded in a recording medium, a signal obtained by communication via a network, and so forth.

Though the second vibration driving unit 25b vibrates the second turning frame 20, thereby vibrating the second weight 21 in the embodiment, the second vibration driving unit 25b may directly vibrate the second weight 21. Also, movement and vibration of the second turning frame 20 may be controlled by a single driving system having the functions of the second movement driving unit 25a and second vibration driving unit 25b. Further, the second turning frame 20 may be vibrated after turning of the second turning frame 20 is completed, or the second turning frame 20 may be vibrated along with turning.

Figure 2:
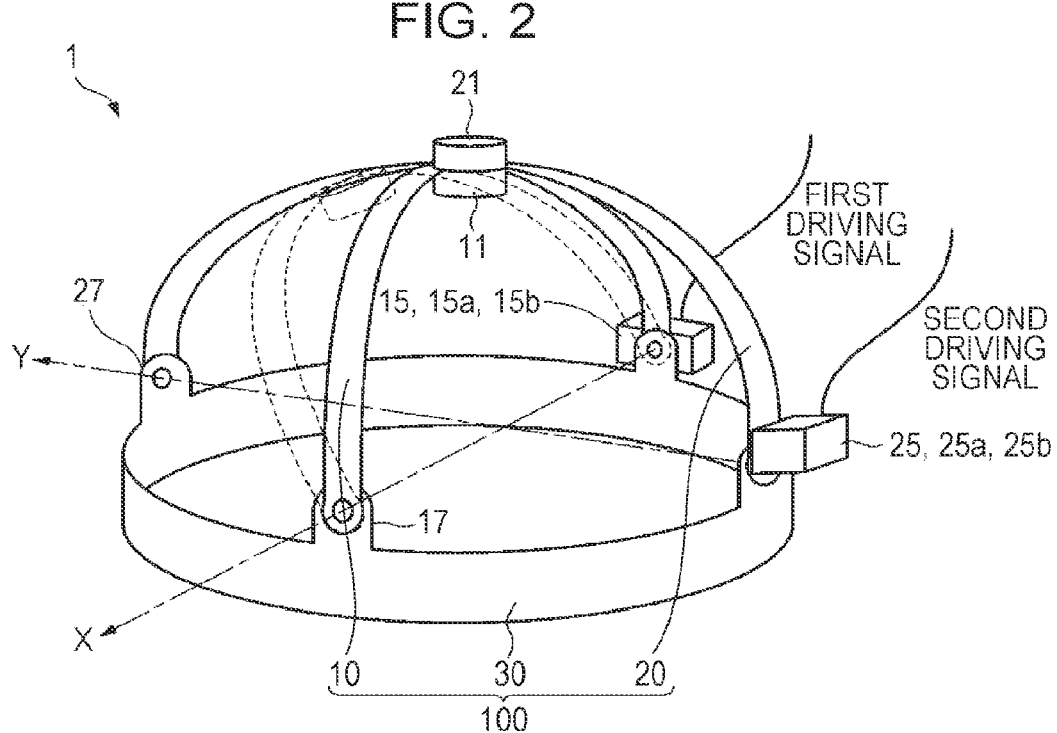
FIG. 2 is a diagram for describing an example of operation of the acceleration sensation presentation apparatus according to the first embodiment.

FIG. 2 illustrates an example of the first turning frame 10 being turned on the X axis as the center by the first movement driving unit 15a. It can be seen in FIG. 2 that the first turning frame 10 is turned on the X axis, to which the pair of the first fixing portions 17 are provided, as the center. Note that, though FIG. 2 illustrates only an example of the first turning frame 10 being turned on the X axis as the center, the second turning frame 20 is similarly turned on the Y axis, to which the pair of the second fixing portions 27 are provided, as the center. Thus, the first weight 11 provided to the first turning frame 10, and the second weight 21 provided to the second turning frame 20 are moved, and consequently, the center of gravity of the acceleration sensation presentation apparatus 1 is changed. Further, the first turning frame 10 is vibrated by the first vibration driving unit 15b.

Change of Center of Gravity of Acceleration Sensation Presentation Apparatus

As described above, the first movement driving unit 15a turns the first turning frame 10, thereby moving the first weight 11. Also, the second movement driving unit 25a turns the second turning frame 20, thereby moving the second weight 21. As a result of this, the center of gravity of the acceleration sensation presentation apparatus 1 is changed. The change in the center of gravity of the acceleration sensation presentation apparatus 1 will be described.

Figure 3:
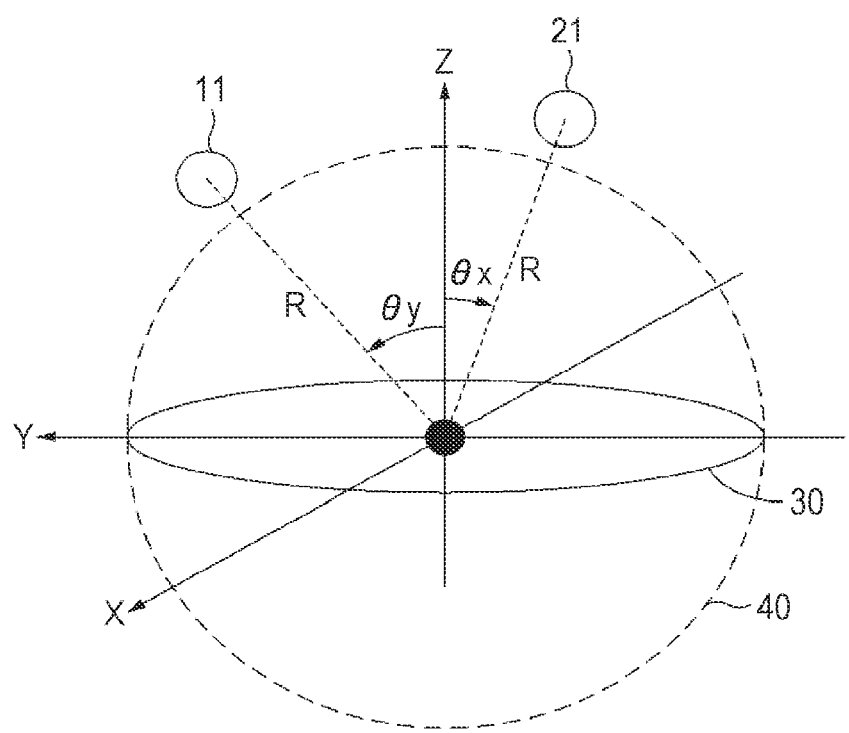
FIG. 3 is a diagram for describing an example of a method for obtaining center of gravity according to the position of a weight.

FIG. 3 is a diagram for describing an example of a method for obtaining the center of gravity of the acceleration sensation presentation apparatus 1 in the case of the first weight 11 and second weight 21 having moved to a predetermined position in the acceleration sensation presentation apparatus 1. The example illustrated in FIG. 3 schematically illustrates the head of a wearer 40, by a circular-shaped dotted line. Now, assuming that the height direction of the wearer 40 is the Z axis, a XYZ space with the center portion of the base frame 30 as the center can be defined.

The first turning frame 10 capable of turning on the X axis as the center is formed in an arc shape with a radius R. The first weight 11 is fixed to the top portion of the first turning frame 10. Accordingly, the first movement driving unit 15a turns the first turning frame 10 on the X axis as the center, whereby the first weight 11 revolves on a Y-Z plane at a position from the center defined by the radius R. The example in FIG. 3 illustrates the first weight 11 which is in a position turned from the Z axis by θy on the Y-Z plane.

The second turning frame 20 capable of turning on the Y axis as the center is formed in an arc shape with the radius R. The second weight 21 is fixed to the top portion of the second turning frame 20. Accordingly, the second movement driving unit 25a turns the second turning frame 20 on the Y axis as the center, whereby the second weight 21 revolves on an X-Z plane at a position from the center defined by the radius R. The example in FIG. 3 illustrates the second weight 21 which is in a position turned from the Z axis by θx on the X-Z plane.

Now, the center of gravity rc of the acceleration sensation presentation apparatus 1 in the example illustrated in FIG. 3 may be obtained, for example, by the following Expression (1). Let us assume that the mass of the second weight 21 which revolves on the X-Z plane with the radius R from the center is $m_x$, the mass of the first weight 11 which revolves on the Y-Z plane with the radius R from the center is $m_y$, and the mass of the acceleration sensation presentation apparatus 1 excluding the first weight 11 and second weight 21 is F.

$$r_c = \frac{\sum_i m_i \cdot r_i}{M} \quad (1)$$

$$= \frac{1}{M}\{0 \cdot F + m_x(R\sin\theta_x, 0, R\cos\theta_x) + m_y(0, R\sin\theta_y, R\cos\theta_y)\}$$

$$= \frac{1}{M}(m_x \cdot R\sin\theta_x, m_y \cdot R\sin\theta_y, m_x \cdot R\cos\theta_x + m_y \cdot R\cos\theta_y)$$

Here, M in Expression (1) is mass of the entire acceleration sensation presentation apparatus 1, and is obtained by $M = F + m_x + m_y$. Now, in the case of setting the same mass m as the mass $m_y$ of the first weight 11 and the mass $m_x$ of the second weight 21 ($m = m_x = m_y$), the center of gravity $r_c$ of the acceleration sensation presentation apparatus 1 may be represented by the following Expression (2).

$$r_c = \frac{m}{M}(R\sin\theta_x, R\sin\theta_y, R\cos\theta_x + R\sin\theta_y) \quad (2)$$

As also understood from the above Expression (2), the center of gravity $r_c$ of the acceleration sensation presentation apparatus 1 is changed according to θx and θy. Specifically, the center of gravity $r_c$ of the acceleration sensation presentation apparatus 1 may optionally be changed by optionally changing the turning angle θx of the second turning frame 20 on the X-Z plane, and the turning angle θy of the first turning frame 10 on the Y-Z plane.

For example, in the case that θx=θy=0, that is, the first turning frame 10 and second turning frame 20 have not been turned, torque of 2 m acts in the Z-axis direction. On the other hand, we can see that torque in the Z direction is reduced as ex and θy approach ninety degrees. Thus, the center of gravity $r_c$ of the acceleration sensation presentation apparatus 1 according to the present embodiment may optionally be changed by changing θx and θy.

Consequently, the acceleration sensation presentation apparatus 1 according to the present embodiment may present an optional acceleration sensation to the wearer 40 by applying optional torque to the head of the wearer 40.

That is to say, the acceleration sensation presentation apparatus 1 may present an acceleration sensation to the wearer 40 by optionally changing the center of gravity of the headgear-type apparatus worn on the head.

Also, the farther the center of gravity position of the acceleration sensation presentation apparatus 1 is from the center of the head of the wearer 40, the greater the torque as to the center of the head of the wearer 40 is, and the more effectively an acceleration sensation can be presented to the wearer 40. We can see from the above Expression (2) that the greater the value of m/M is, the farther the position of the center of gravity is from the center. Accordingly, it is desirable to set the mass of the first weight 11 and second weight 21 so that the value of m/M approaches 1. Though it is desirable for the acceleration sensation presentation apparatus 1 according to the embodiment to have the value of m/M set to a value at least equal to or greater than 0.5, the value thereof is not restricted to this.

Vibration of Weight at Acceleration Sensation Presentation Apparatus

As described above, the first vibration driving unit 15b vibrates the first turning frame 10, thereby vibrating the first weight 11, and the second vibration driving unit 25b vibrates the second turning frame 20, thereby vibrating the second weight 21. The vibration of the weights in the acceleration sensation presentation apparatus 1 will be described.

As illustrated in FIG. 3, the positions of the first weight 11 and second weight 21 are represented by θx and θy, respectively. Now, if we say that the value of the acceleration of the X axis is represented by ax, the acceleration of the Y axis is represented by ay, and actual time is t, each of the weights is vibrated using a driving signal defined by functions of θx (ax, ay, az, t) and θy (ax, ay, az, t). The following Expressions (3) and (4) indicate an example of the functions.

$$\theta_x = ax \cdot cx \cdot ax \cdot ax \cdot \sin(2\pi \cdot fx \cdot t) \quad (3)$$

$$\theta_y = ay \cdot cy \cdot ay \cdot ay \cdot \sin(2\pi \cdot fy \cdot t) \quad (4)$$

The cx and cy in Expressions (3) and (4) are a constant on the X axis and a constant on the Y axis respectively, and optional values may be set for these. The constants cx and cy may be the same value, or may be different values. As described above, t is actual time. The fx and fy are vibration frequencies regarding time, and may be the same value, or may be different values. According to Expressions (3) and (4), the positions of the weights may be represented by vibration.

The first terms in Expressions (3) and (4) represent the movement amount of a turning frame (substantially equivalent to the displacement amount of the weights), and contribute to operation of the first movement driving unit 15a and second movement driving unit 25a. The second terms in Expressions (3) and (4) represent the vibration amplitude of the turning frames (substantially equivalent to the vibration amplitude of the weights), and contribute to operation of the first vibration driving unit 15b and second vibration driving unit 25b. In the case that the movement and amplitude of the turning frames is controlled by a single driving system, the first terms and second terms contribute to operation of this driving system. Note that the reason why ax and ay is squared in the second term in Expression (3) and the second term in Expression (4) is to exaggerate the influence of acceleration to be applied to the displacement amount and vibration amplitude of the weights.

Figure 4:
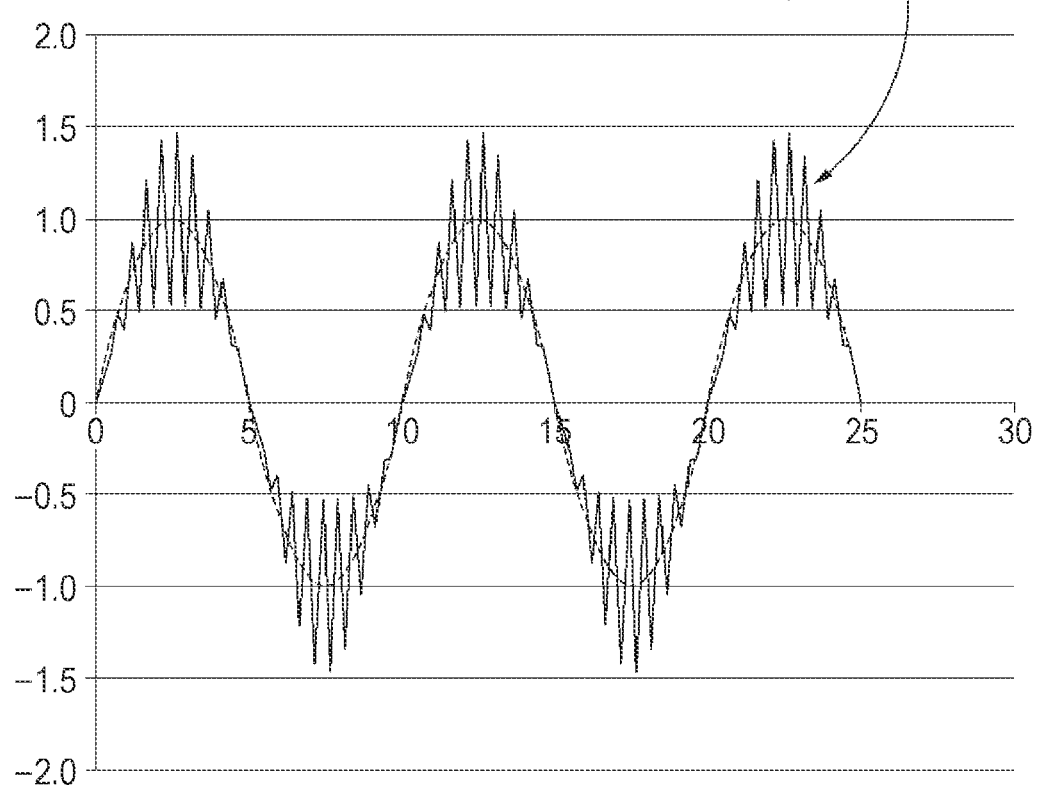
FIG. 4 is a diagram illustrating an example of the waveform of a driving signal.

For example, if we say that fx is 2 Hz, and ax is a sine wave of 0.1 Hz represented by sin (2π·0.1·t), the vibration waveform of θx is as illustrated by a solid line in FIG. 4.

Note that the dotted line in FIG. 4 represents the waveform of an acceleration signal. It is apparent from Expression (3) and FIG. 4 that the greater the acceleration represented by the acceleration signal ax is, the greater the displacement amount and vibration amplitude of the weight is.

The driving signal defined by Expression (3) is supplied to the second driving unit 25 as a second driving signal. The second movement driving unit 25a and second vibration driving unit 25b operate according to the supplied second driving signal, and the second weight 21 moves and vibrates according to the turning and vibration of the second turning frame 20. The driving signal defined by Expression (4) is supplied to the first driving unit 15 as a first driving signal. The first movement driving unit 15a and first vibration driving unit 15b operate according to the supplied first driving signal, and the first weight 11 moves and vibrates according to the turning and vibration of the first turning frame 10.

Another example of functions for defining the displacement amount and vibration amplitude of a weight will be described. This other example is an example wherein change in acceleration is exaggerated. The following Expressions (5) to (7) represent the other examples of the functions.

$$Px(k)=d(ax)/dt(Px(k-1)<d(ax)/dt) \quad (5)$$

$$Px(k)=Px(k-1)-(1-\alpha x)(Px(k-1)\geq d(ax)/dt) \quad (6)$$

$$\theta_x=Px(k)+cx \cdot Px(k) \cdot Px(k) \cdot \sin(2\pi \cdot fx \cdot t) \quad (7)$$

The d(ax)/dt in Expressions (5) and (6) represents change in acceleration. Also, Px(k) is a value used for an expression for defining a driving signal θx in Expression (7), and Px(k−1) represents a value set one ahead of Px(k), and k means discrete time.

As indicated in Expression (5), in the case that Px(k−1)<d(ax)/dt, that is, in the case that change in acceleration is great, d(ax)/dt is set as Px(k). In the case that Px(k−1)≥d(ax)/dt, that is, in the case that change in acceleration is small, Px(k−1)·(1−αx) is set as Px. Here, α represents an updating coefficient as to x, and acts in a direction such that the value of Px(k) is attenuated. As indicated in Expression (7), the driving signal (second driving signal) θx is obtained based on the Px(k) set beforehand. Note that the same expressions as Expressions (5) to (7) may also be defined with regard to y.

Figure 5:
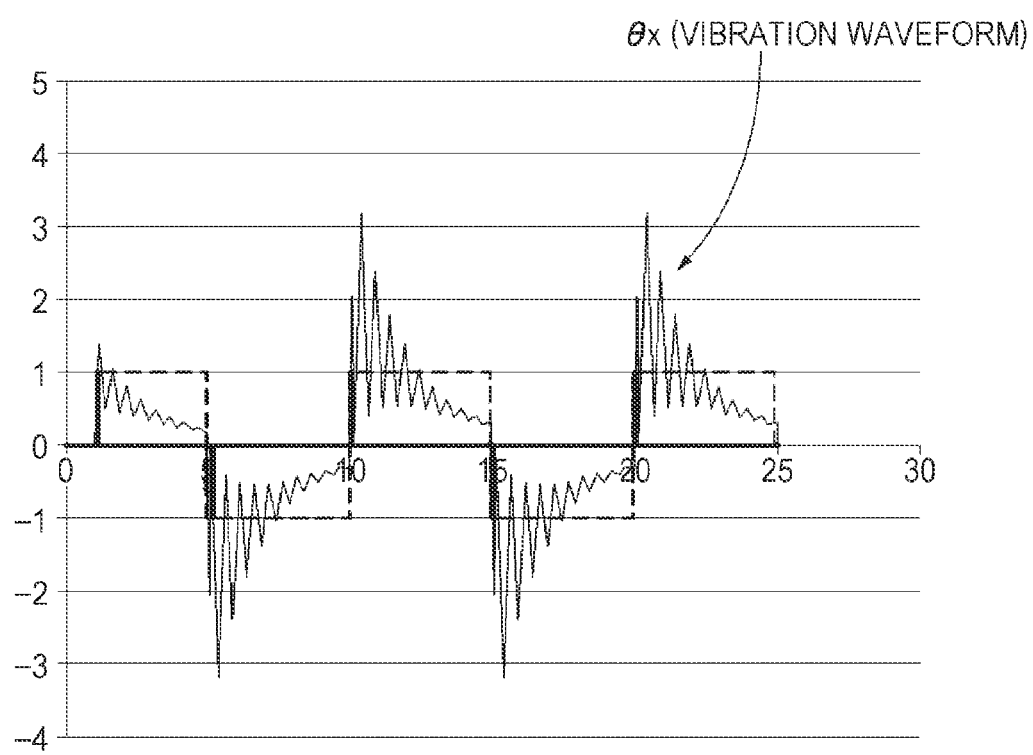
FIG. 5 is a diagram illustrating another example of the waveform of the driving signal.

The solid line in FIG. 5 illustrates an example of the vibration waveform of a diving signal based on another example of the functions. FIG. 5 illustrates an acceleration signal in a step-shaped waveform, indicated by a dotted line. Portions with great change in acceleration are illustrated by heavy lines. As illustrated in FIG. 5, the vibration amplitude of the weight increases at portions with great change in acceleration, the vibration amplitude is attenuated at portions with small change in acceleration or without change.

The user is enabled to experience virtual reality by receiving an acceleration sensation accompanying video and so forth using the acceleration sensation presentation apparatus 1. However, experiencing virtual reality may incur a problem of dulling of physical sensation due to familiarization. Specifically, the user has a tendency to have a difficulty to physically sense small acceleration after physically sensing great acceleration, and a tendency for physical sensation to dull over time after having continuously physically sensed constant small acceleration. However, as described above, in the case that change in acceleration is small or there is no change, dulling of physical sensation due to familiarization may be prevented by attenuating acceleration presented to the user. For example, even in the case that small acceleration actually continues, the wearer 40 may physically sense change in acceleration more effectively without dulling of physical sensation due to familiarization. Note that the exemplified functions are an example, and it goes without saying that the driving signals may be defined by optional functions.

Wearing Example of Acceleration Sensation Presentation Apparatus

Figure 6:
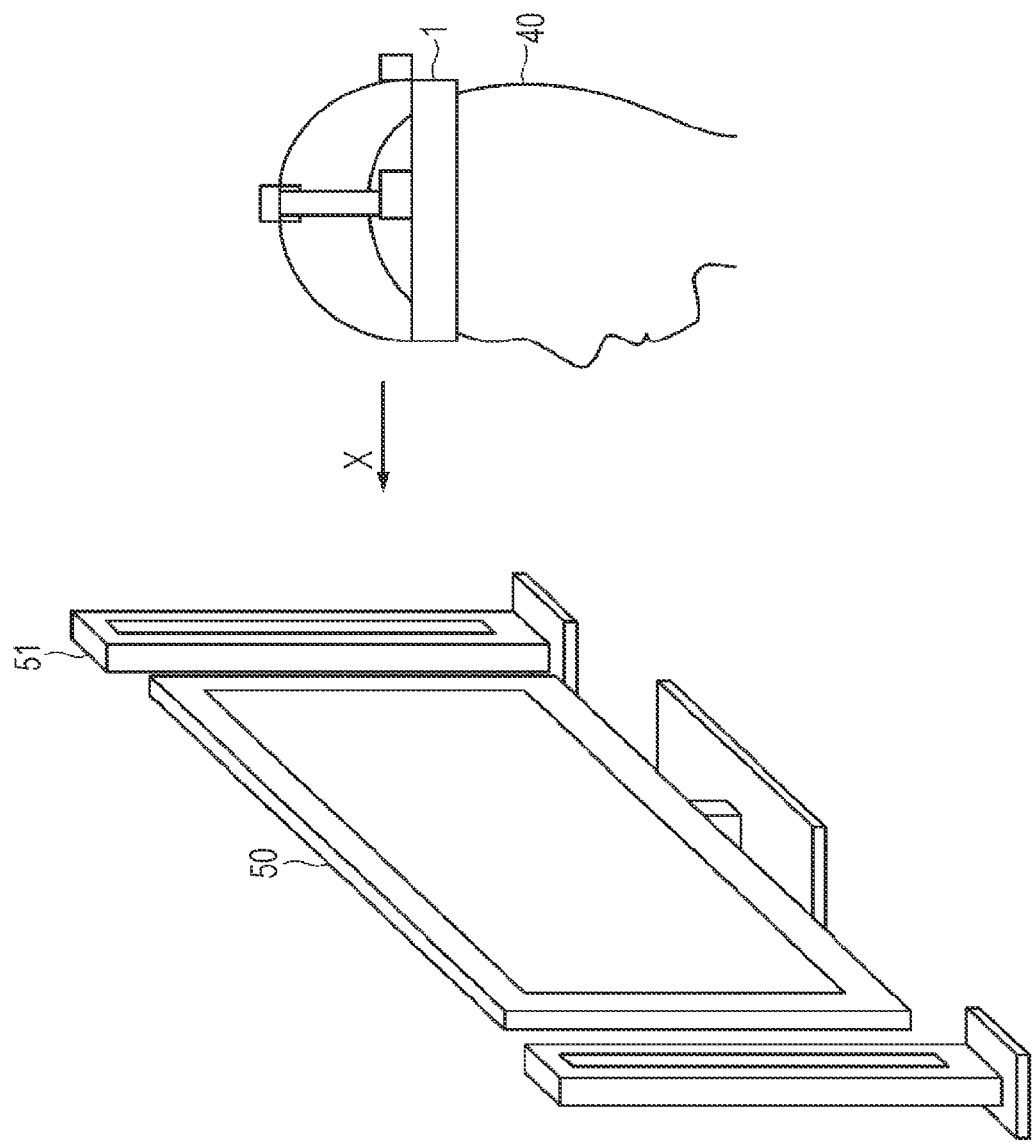
FIG. 6 is a diagram for describing a wearing example of the acceleration sensation presentation apparatus as to a user.

Next, a wearing example for a user of the acceleration sensation presentation apparatus 1 will be described with reference to FIG. 6. FIG. 6 is a diagram for describing a wearing example of the acceleration sensation presentation apparatus 1.

As illustrated in FIG. 6, the wearer 40 can wear the acceleration sensation presentation apparatus 1 on the head. Thus, the acceleration sensation presentation apparatus 1 can present an acceleration sensation to the wearer 40 in a synchronized manner with the contents of a video displayed on a display 50, for example. Specifically, the first driving unit 15 and second driving unit 25 receive a driving signal for turning and vibrating the first turning frame 10 and second turning frame 20 in a synchronized manner with the contents of a video displayed on the display 50.

An acceleration sensation can be presented to the wearer 40 by changing the center of gravity of the acceleration sensation presentation apparatus 1 in a synchronized manner with the contents of a video on the display 50, and also vibrating the first weight 11 and second weight 21. That is to say, the wearer 40 can experience an acceleration sensation in a synchronized manner with the contents of a video along with a video displayed on the display 50 and audio output from a speaker 51, and enjoy a virtual reality sensation. Note that the example illustrated in FIG. 6 is an example, and the configuration of the acceleration sensation presentation apparatus 1 is not restricted to this. An acceleration sensation may be presented to the wearer 40 in a synchronized manner with a video displayed on a display of a gaming machine or some other device in a game arcade, amusement park, movie theater, or the like, besides the display 50 and speaker 51 illustrated in FIG. 6.

The acceleration sensation presentation apparatus 1 may further include a head-mounted display 55, and a speaker 56 as a modification of the acceleration sensation presentation apparatus 1. A wearing example of the acceleration sensation presentation apparatus 1 as to the wearer 40 at this time is illustrated in FIG. 7.

Figure 7:
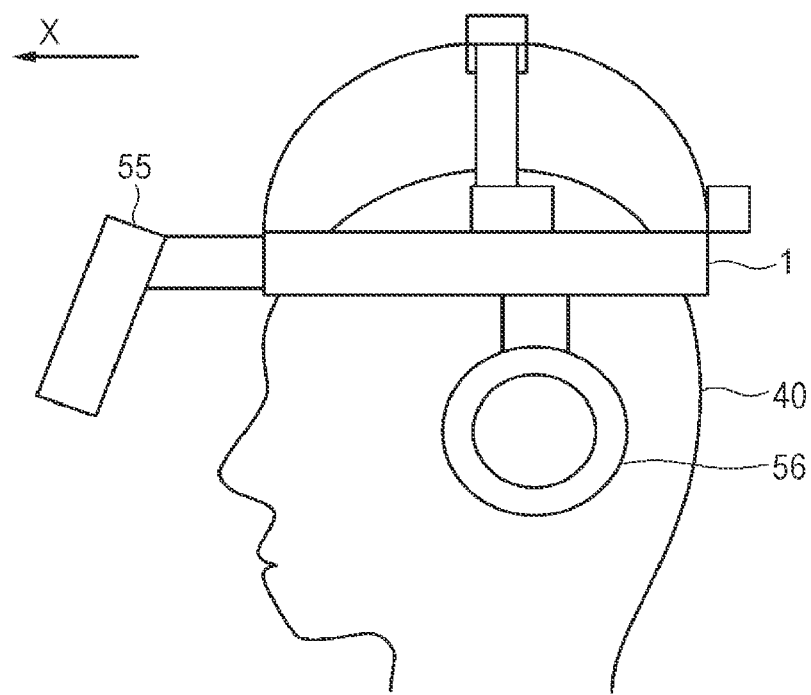
FIG. 7 is a diagram for describing a wearing example of the acceleration sensation presentation apparatus as to a user.

As illustrated in FIG. 7, the acceleration sensation presentation apparatus 1 may further provide a head-mounted display 55 to the front side of the apparatus on the X axis, and provide a pair of speakers 56 to the left and right of the apparatus on the Y axis. In this case, the head-mounted display 55 is positioned in front of the wearer 40, and the pair of speakers 56 is positioned near the ears of the wearer 40.

Supplying a video signal to the head-mounted display 55 enables the wearer 40 to view a video displayed on the head-mounted display 55. Supplying an audio signal to the speakers 56 enables the wearer 40 to listen to audio output from the speakers 56. The acceleration sensation presentation apparatus 1 enables video, audio, and acceleration sensation to be presented together to the wearer 40. Consequently, the user is enabled to physically sense virtual reality even at home or the like using the small-type acceleration sensation presentation apparatus 1, unlike an apparatus according to the related art using a stage.

System Using Acceleration Sensation Presentation Apparatus

Figure 8:
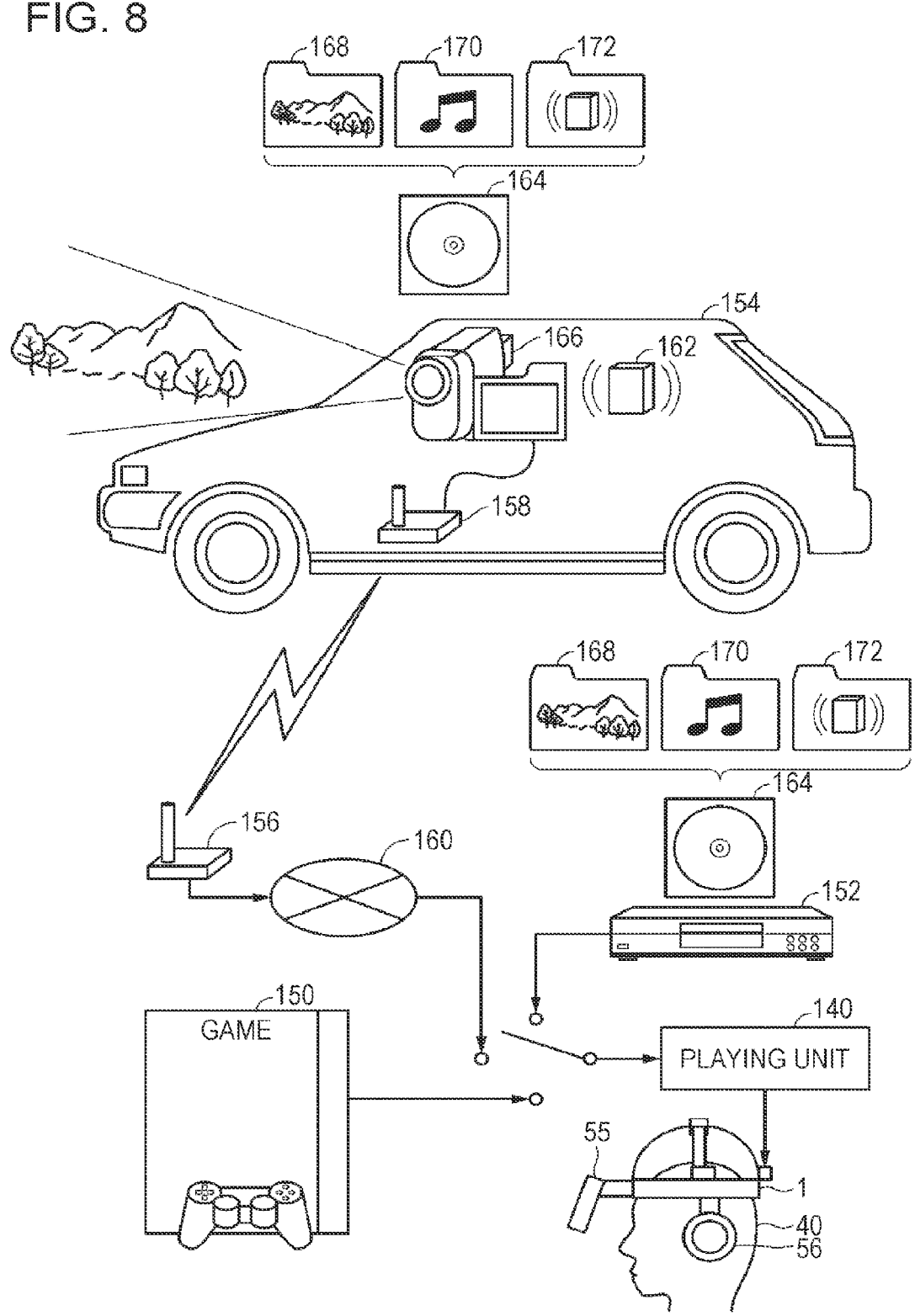
FIG. 8 is a diagram for describing an example of a system employing the acceleration sensation presentation apparatus.

Next, description will be made regarding an example of a system using the acceleration sensation presentation apparatus 1 configured as described above. FIG. 8 illustrates an example of a system using the acceleration sensation presentation apparatus 1. The example in FIG. 8 is an example using the acceleration sensation presentation apparatus 1 including the head-mounted display 55 and speakers 56.

As illustrated in FIG. 8, the acceleration sensation presentation apparatus 1 obtains the first driving signal and second driving signal from a playing unit 140. The playing unit 140 may be built into the acceleration sensation presentation apparatus 1, or may be built into a device different from the acceleration sensation presentation apparatus 1. The playing unit 140 obtains acceleration signals (referred to as acceleration information as appropriate), video signals, audio signals, and so forth from external devices. Examples of the external devices include an imaging apparatus, a riding device including an imaging apparatus, a riding device to be remotely controlled, a robot to be remotely controlled, a model to be remotely controlled, a gaming machine configured to execute a game program, and a recording medium.

The playing unit 140 obtains acceleration information and so forth from these external devices, for example, via a network such as the Internet or the like. The playing unit 140 subjects the obtained acceleration information and so forth to various types of processing such as decoding processing, synchronization processing, amplification processing, or the like. Also, the playing unit 140 is capable of transmitting a game software program, and transmitting video, audio, acceleration signals, and so forth, recorded in a recording medium such as a Digital Versatile Disc (DVD) or the like to the acceleration sensation presentation apparatus 1.

The playing unit 140 is capable of transmitting, for example, video signals received via an information processing apparatus or network to the head-mounted display 55 of the acceleration sensation presentation apparatus 1. Thus, the acceleration sensation presentation apparatus 1 enables this video to be displayed on the head-mounted display 55. Also, the playing unit 140 is capable of transmitting, for example, audio signals received via an information processing apparatus or network to the speakers 56 of the acceleration sensation presentation apparatus 1. Thus, the acceleration sensation presentation apparatus 1 enables this audio to be output from the speakers 56.

Further, the playing unit 140 generates the first driving signal used for turning and vibrating the first turning frame 10 based on the acceleration information received via a network, for example. Next, the playing unit 140 supplies the generated first driving signal to the first driving unit 15 of the acceleration sensation presentation apparatus 1. The first driving signal may be supplied to the first driving unit 15 by cable or wirelessly.

Further, the playing unit 140 generates the second driving signal used for turning and vibrating the second turning frame 20 based on the acceleration information received via a network, for example. Next, the playing unit 140 supplies the generated second driving signal to the second driving unit 25 of the acceleration sensation presentation apparatus 1. The second driving signal may be supplied to the second driving unit 25 by cable or wirelessly. Acceleration information is supplied to the playing unit 140 at a predetermined timing.

The first driving unit 15 of the acceleration sensation presentation apparatus 1 is capable of turning and vibrating the first turning frame 10 based on the first driving signal. As a result of this, the first weight 11 moves and vibrates. Also, the second driving unit 25 of the acceleration sensation presentation apparatus 1 is capable of turning and vibrating the second turning frame 20 based on the second driving signal. As a result of this, the second weight 21 moves and vibrates. Specifically, the acceleration sensation presentation apparatus 1 enables video, audio, and acceleration sensation to be synchronously presented to the wearer 40 based on video signals, audio signals, and driving signals (first driving signal and second driving signal) obtained via the playing unit 140. Thus, the wearer 40 is enabled to enjoy a virtual reality sensation in which the wearer 40 can experience video, audio, and acceleration sensation simultaneously.

For example, the example illustrated in FIG. 8 enables the wearer 40 to experience, based on various types of signal information from an automobile 154 traveling at a remote location, the same sensation as with a driver of this automobile 154 in a virtual manner. Specifically, this is realized by equipping the automobile 154 with an imaging apparatus 166 configured to image the landscape in front of the automobile 154. Here, the imaging apparatus 166 includes, for example, an imaging unit configured to image the traveling direction of the automobile 154 and to record this as video signals, and an audio recording unit configured to record audio input via speakers or the like as audio signals.

Further, an acceleration sensor 162 is provided to the imaging apparatus 166. The acceleration sensor 162 is a sensor configured to measure gravitational acceleration generated by movement of the automobile 154. Examples to be used as this acceleration sensor 162 include a micro electro mechanical systems (MEMS) sensor, for example, such as a piezoresistive type, a capacitive type, a thermal detection type, or the like, and an acceleration sensor such as a piezoelectric type, an electrokinetic type, or the like. It goes without saying that these are examples of the acceleration sensor 162, and the acceleration sensor 162 is not restricted to a particular type of sensor as long as the sensor is capable of measuring gravitational acceleration generated by movement of the automobile 154.

For example, with the forward and backward direction of the automobile 154 as an X direction, and the left and right direction of the automobile 154 as a Y direction, and the upward direction of the automobile 154 as a Z direction, the acceleration sensor 162 is capable of detecting an acceleration vector that the driver experiences in comparison to the zero vector of the stationary ground, from a total of acceleration levels of X, Y, and Z. Note that the acceleration sensor 162 may be installed into the automobile 154 independently from the imaging apparatus 166.

As described above, video signals and audio signals imaged by the imaging apparatus 166 of the automobile 154, and acceleration signals detected by the acceleration sensor 162 are transmitted from a transmitter 158 included in the automobile 154 to the playing unit 140. Note that the example illustrated in FIG. 8 enables the playing unit 140 to receive various signals from the automobile 154 at a remote location via a receiver 156 or the Internet 160 or the like. It goes without saying that the example illustrated in FIG. 8 is an example, and the playing unit 140 may directly receive various signals, for example, by cable connection.

The acceleration sensation presentation apparatus 1 may also provide a virtual reality sensation to the wearer 40 by receiving various types of information from a video player 152 such as a DVD recorder, hard disk recorder, or the like via the playing unit 140.

The example illustrated in FIG. 8 also enables the playing unit 140 to receive video signals, audio signals, acceleration signals, and so forth from the video player 152 and to transmit to the acceleration sensation presentation apparatus 1. For example, various types of data imaged or detected by the imaging apparatus 166 or acceleration sensor 162 within the automobile 154 may be synchronized and recorded in a recording medium 164 such as a DVD, SD card, memory stick (registered trademark), tape, or the like as video data 168, audio data 170, and acceleration data 172. Accordingly, the video player 152 enables the video data 168, audio data 170, acceleration data 172, and so forth recorded in the recording medium 164 to be transmitted to the acceleration sensation presentation apparatus 1 via the playing unit 140. Note that, in this case, the playing unit 140 may be provided to the video player 152 or may be provided to the acceleration sensation presentation apparatus 1.

Thus, the acceleration sensation presentation apparatus 1 displays a video on the head-mounted display 55, and outputs audio from the speakers 56 based on various types of data recorded in the recording medium 164. Further, the acceleration sensation presentation apparatus 1 enables an acceleration sensation to be presented to the wearer 40 by changing the center of gravity of the acceleration sensation presentation apparatus 1 and vibrating the weights (first weight 11 and second weight 21) of the acceleration sensation presentation apparatus 1. As a result of this, the wearer 40 is enabled to experience landscape viewed, audio listened to, and sensation experienced by the driver of the automobile 154, and so forth, in a virtual manner.

Also, the acceleration sensation presentation apparatus 1 may also provide a virtual reality sensation to the wearer 40 by receiving various signals from a gaming machine 150 via the playing unit 140.

The example illustrated in FIG. 8 also enables the playing unit 140 to receive video signals, audio signals, acceleration signals, and so forth, from the gaming machine 150 and to transmit to the acceleration sensation presentation apparatus 1. For example, acceleration signals in accordance with movement of a character, vehicle, or the like may also be built into a software program for a game which operates in the gaming machine 150, in advance. Thus, the gaming machine 150 enables video signals, audio signals, acceleration signals, and so forth built into the software program for the game, to be transmitted to the acceleration sensation presentation apparatus 1 via the playing unit 140. Note that in this case, the playing unit 140 may be provided to the gaming machine 150 or may be provided to the acceleration sensation presentation apparatus 1.

Thus, the acceleration sensation presentation apparatus 1 displays a video on the head-mounted display 55 and outputs audio from the speakers 56 based on various types of data built into the software program which operates on the gaming machine 150. Further, the acceleration sensation presentation apparatus 1 enables an acceleration sensation to be presented to the wearer 40 by changing the center of gravity of the acceleration sensation presentation apparatus 1 and vibrating the weights (first weight 11 and second weight 21) of the acceleration sensation presentation apparatus 1. As a result of this, the wearer 40 is enabled to enjoy a virtual reality sensation corresponding to movement of a character or vehicle or the like of the game.

2. Second Embodiment

Figure 9:
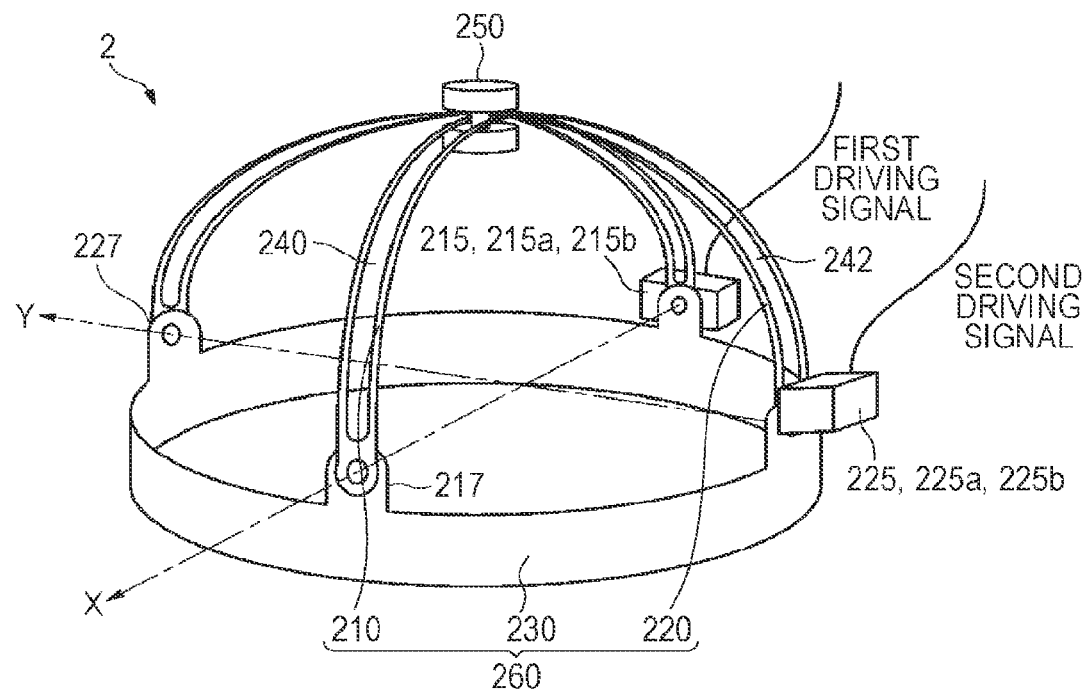
FIG. 9 is a diagram illustrating an example of an overall configuration of an acceleration sensation presentation apparatus according to a second embodiment.

FIG. 9 illustrates an example of an external appearance configuration of an acceleration sensation presentation apparatus according to the second embodiment. As illustrated in FIG. 9, an acceleration sensation presentation apparatus 2 includes, in the same way as with the above-described acceleration sensation presentation apparatus 1, a first turning frame 210, a second turning frame 220, a base frame 230, a first driving unit 215, and a second driving unit 225.

A pair of first fixing portions 217 configured to fix the first turning frame 210 is concentrically formed above the base frame 230 so as to turn on the X axis as the center. Also, a pair of second fixing portions 227 configured to fix the second turning frame 220 are concentrically formed above the base frame 230 so as to turn on the Y axis as the center. A frame 260 is configured of the first turning frame 210, second turning frame 220, and base frame 230.

A first elongated slide hole 240 and a second elongated slide hole 242 are provided to the first turning frame 210 and second turning frame 220, unlike the first embodiment, so as to be disposed along the arc of the corresponding frame, respectively. Further, as illustrated in FIG. 9, a weight 250 is inserted into the first slide hole 240 and second slide hole 242 in a position where the first turning frame 210 and second turning frame 220 cross. That is to say, the first turning frame 210 and second turning frame 220 are connected by the weight 250.

The first driving unit 215 and second driving unit 225 turn and vibrate the first turning frame 210 and second turning frame 220 based on a first driving signal and a second driving signal which are received from the playing unit 140. Note that, though detailed drawings will be omitted, the first driving unit 215 includes a first movement driving unit 215a and a first vibration driving unit 215b, and the second driving unit 225 includes a second movement driving unit 225a and a second vibration driving unit 225b, in the same way as with the first embodiment.

In the case of the acceleration sensation presentation apparatus 2, for example, upon the first turning frame 210 alone being turned by the first movement driving unit 215a, the weight 250 consequently slides along the second slide hole 242 of the second turning frame 220. On the other hand, upon the second turning frame 220 alone being turned by the second movement driving unit 225a, the weight 250 consequently slides along the first slide hole 240 of the first turning frame 210. Thus, the acceleration sensation presentation apparatus 2 enables the weight 250 to be moved to an optional position by sliding the single weight 250 along at least one of the first slide hole 240 and second slide hole 242.

Further, the acceleration sensation presentation apparatus 2 enables the single weight 250 to be moved not only on the X-Z plane and Y-Z plane but also to an optional position by turning both of the first turning frame 210 and second turning frame 220. Further, the acceleration sensation presentation apparatus 2 enables the weight 250 moved to an optional position to be vibrated by vibrating at least one of the first turning frame 210 and second turning frame 220. Accordingly, the acceleration sensation presentation apparatus 2 enables the center of gravity of the apparatus itself to be optionally changed by the single weight 250 alone, unlike the acceleration sensation presentation apparatus 1.

Note that the acceleration sensation presentation apparatus 2 may include only one of the first vibration driving unit 215b and second vibration driving unit 225b, that is, the weight 250 may be vibrated by vibrating at least one of the first turning frame 210 and second turning frame 220 using the single vibration driving unit.

Here, if we say that the mass of the weight 250 is m, from the same viewpoint as with the first embodiment, the center of gravity $r_c$ of the acceleration sensation presentation apparatus 2 is consequently calculated by the following Expression (8).

$$r_c = \frac{\sum_i m_i \cdot r_i}{M}$$
$$= \frac{m}{M}(R\sin\theta_x, R\sin\theta_y, R\cos\theta_x) \quad (8)$$

Thus, the acceleration sensation presentation apparatus 2 enables simplification of the apparatus, and simplification of control of the apparatus, to be realized in comparison with the acceleration sensation presentation apparatus 1. Note that, though the same system as with the acceleration sensation presentation apparatus 1 and processing by the playing unit 140 may be applied to the acceleration sensation presentation apparatus 2, redundant description will be omitted here.

3. Modifications

Though the embodiments of the present disclosure have specifically been described so far, the present disclosure is not restricted to the above-described embodiments, and various modifications based on the technical idea of the present disclosure may be made. Hereinafter, modifications will be described.

First Modification

Figure 10:
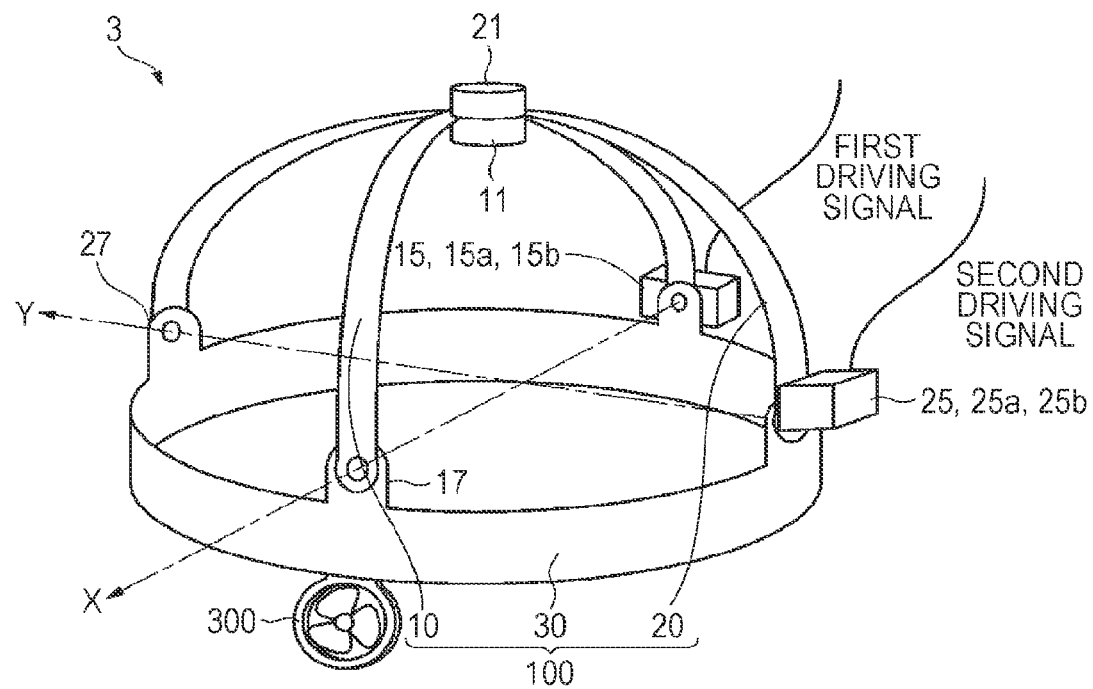
FIG. 10 is a diagram for describing an example of an acceleration sensation presentation apparatus according to a modification.

FIG. 10 illustrates an example of an external appearance of an acceleration sensation presentation apparatus according to a modification. The principal configurations and operation of an acceleration sensation presentation apparatus 3 illustrated in FIG. 10 are the same as with the acceleration sensation presentation apparatus 1. A point different from the acceleration sensation presentation apparatus 1 is in that the acceleration sensation presentation apparatus 3 includes a fan 300. The fan 300 is provided in the vicinity of the first fixing portions 17 in the base frame 30. A position where the fan 300 is provided is a generally front position of the wearer 40 of the acceleration sensation presentation apparatus 3. It goes without saying that the position where the fan 300 is provided may be set as appropriate. Two or more fans may be provided. Also, the fan 300 may be separated from the acceleration sensation presentation apparatus 3, or may be detachable from the acceleration sensation presentation apparatus 3.

A fan driving signal is supplied to the fan 300 by cable or wirelessly. Note that illustration of a supply path for the fan driving signal is omitted in FIG. 10. The fan 300 rotates according to the fan driving signal, and provides wind pressure to the wearer 40. The fan driving signal is generated, for example, by the playing unit 140. Specifically, the playing unit 140 generates the fan driving signal based on an acceleration signal, and supplies the generated fan driving signal to the fan 300.

For example, an acceleration sensor provided to a motorcycle detects an acceleration signal for the travelling direction of the motorcycle. The detected acceleration signal is supplied to the playing unit 140. The playing unit 140 generates a fan driving signal for controlling driving of the fan 300 according to the direction and magnitude of the supplied acceleration signal. The acceleration signal for the traveling direction of the motorcycle is detected in this example, and accordingly, the rider of the motorcycle senses wind pressure as the motorcycle travels. Here, the playing unit 140 generates a fan driving signal for rotating the fan 300 by a predetermined number of rotations. For example, in the case that the acceleration signal is great, the playing unit 140 generates a fan driving signal such that the number of rotations of the fan increases. This fan driving signal is supplied to the fan 300, and the fan 300 rotates. As a result of this, the wearer 40 is enabled to physically sense wind pressure sensed by the rider of the motorcycle. Note that the fan may be provided not only to the acceleration sensation presentation apparatus 1 but also to the acceleration sensation presentation apparatus 2.

Second Modification

Figure 11:
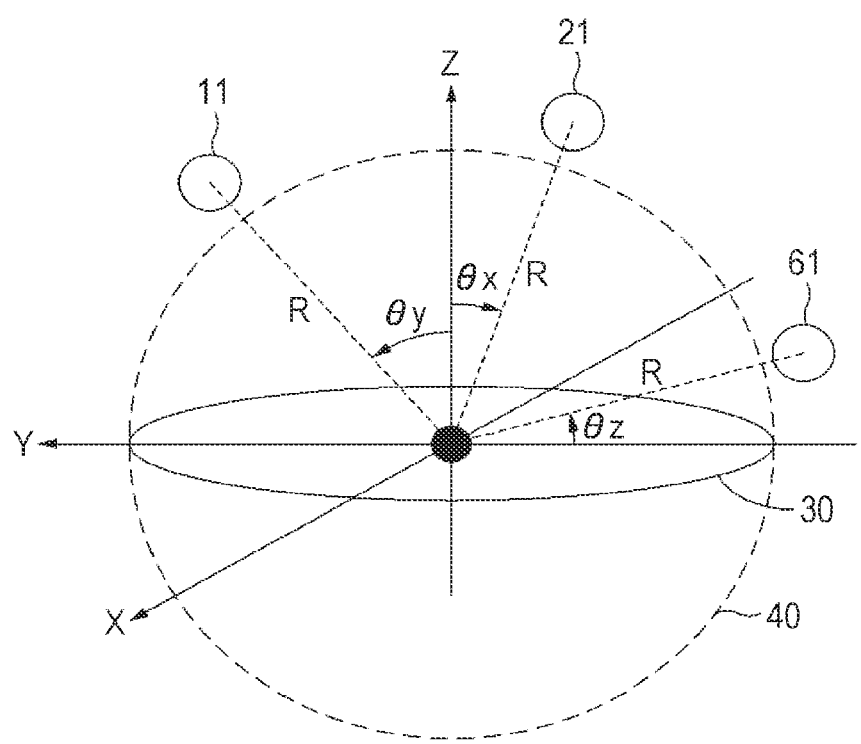
FIG. 11 is a diagram for describing another example of an acceleration sensation presentation apparatus according to a modification.

The numbers of the turning frames and weights are not restricted to examples described by the above-described embodiments. For example, as illustrated in FIG. 11, the acceleration sensation presentation apparatus may include an arc-shaped third turning frame (omitted from illustration), and a third weight 61 attached to the top portion of the third turning frame. The third weight 61 moves, for example, on the same plane (Y-Z plane) as with the first weight 11, but the move range of the third weight 61 is set so as to differ from the move range of the first weight 11, and is adjusted so that the first weight 11 does not collide with the third weight 61. For example, the third weight 61 before move is disposed in one of positions where the base frame 30 and the Y axis cross. The move range of the third weight 61 (range of θz in FIG. 11) is set small to around 10 degrees, for example. The acceleration sensation presentation apparatus enables vibration in the Z-axis direction to be applied to the wearer 40 by vibrating the third weight 61 in the moved position. The displacement amount and vibration amplitude of the third weight 61 may be defined in the same way as with the above-described Expressions (3) and (4), for example.

Now, an arrangement may be made wherein the third weight 61 is not for changing the center of gravity of the acceleration sensation presentation apparatus but for providing vibration in the Z-axis direction to the wearer 40. However, in this case, it is desirable to attach a counterbalance weight at a position generally opposing the position of the third weight 61 on the base frame 30 to prevent the center of gravity from being shifted from a desired position by the third weight 61.

Third Modification

A sensor configured to detect motion (such as change in posture) of a wearer of the acceleration sensation presentation apparatus may be provided to an appropriate position in the frame of the acceleration sensation presentation apparatus. The driving signal based on the acceleration signal can then be corrected according to the change in the posture of the wearer obtained from the sensor. This processing is performed by the playing unit 140, for example. The first turning frame 10 or the like is moved and vibrated based on the driving signal after correction, and the first weight 11 or the like vibrates.

For example, an arrangement may be made wherein the field view of a displayed video is changed from the amount of motion of the wearer of the acceleration sensation presentation apparatus, and also coordinates conversion of the acceleration information is performed to present acceleration sensation in a synchronized manner with the change in the field view.

Other Modifications

The present disclosure is not restricted to an apparatus, and may be realized by a method, a program, a system, or the like. The program may be provided to a user via a network or via transportable memory such as an optical disc, semiconductor memory, or the like.

Note that configurations and processes in the embodiments and modifications may be combined as appropriate within a range not causing technical conflict. Each process sequence in the exemplified process flows may be changed as appropriate within a range not causing technical conflict.

The present disclosure may also be applied to a so-called cloud system wherein the exemplified processes are processed at multiple devices in a distributed manner. The present disclosure may be realized as a system wherein the processes exemplified in the embodiments and modifications are executed, and as an apparatus wherein at least some processes of the exemplified processes are executed.

Note that the present disclosure may have the following configurations.

(1) An acceleration sensation presentation apparatus including: a frame to be worn on the head of a user; at least one or more weights provided to the frame; and a vibration driving unit configured to vibrate the weight to be moved.

(2) The acceleration sensation presentation apparatus according to (1), wherein the center of gravity according to the position of the weight is changed by movement of the weight.

(3) The acceleration sensation presentation apparatus according to (1) or (2), wherein the frame includes a base frame to be tightly worn so as to surround at least a portion of the head of the user, a generally arc-shaped first turning frame fixed to the base frame so as to turn on an axis extending in a first direction which is an optional radial direction of the base frame, and a generally arc-shaped second turning frame fixed to the base frame so as to turn on an axis extending in a second direction orthogonal to the first direction as an axis.

(4) The acceleration sensation presentation apparatus according to (3), wherein the weights include a first weight to be fixed to the top portion of the first turning frame, and a second weight to be fixed to the top portion of the second turning frame; and wherein the vibration driving unit includes a first vibration driving unit configured to vibrate the first weight, and a second vibration driving unit configured to vibrate the second weight.

(5) The acceleration sensation presentation apparatus according to (4), wherein the frame includes a third turning frame which is configured to turn on an axis extending in the second direction and also to which a movable range different from the movable range of the second turning frame is set; wherein the weights include a third weight to be fixed to the top portion of the third turning frame; and wherein the vibration driving unit includes a third vibration driving unit configured to vibrate the third weight.

(6) The acceleration sensation presentation apparatus according to (3), wherein a first elongated slide hole along the arc of the first turning frame is provided to the first turning frame; wherein a second elongated slide hole along the arc of the second turning frame is provided to the second turning frame; wherein the weight is inserted into the first slide hole and the second slide hole in a position where the first turning frame and the second turning frame cross; and wherein the weight is moved by being slid along at least one of the first slide hole and the second slide hole.

(7) The acceleration sensation presentation apparatus according to any one of (1) to (6), further including: a movement driving unit configured to move the weight.

(8) The acceleration sensation presentation apparatus according to (7), wherein the movement driving unit is provided corresponding to each of the turning frames, and moves the weight by turning the corresponding turning frame.

(9) The acceleration sensation presentation apparatus according to any one of (1) to (3), further including: a playing unit configured to supply a driving signal obtained based predetermined acceleration information to the vibration driving unit, wherein the vibration driving unit vibrates the weight based on the driving unit.

(10) The acceleration sensation presentation apparatus according to (9), wherein the driving signal is set so as to increase the magnitude of vibration of the weight in a case where change in the acceleration information is great.

(11) The acceleration sensation presentation apparatus according to (9) or (10), wherein the acceleration information is supplied to the playing unit via a network.

(12) The acceleration sensation presentation apparatus according to any one of (9) to (11), further including: a head-mounted display configured to display a predetermined video, wherein the playing unit transmits a video signal supplied via a network to the head-mounted display.

(13) The acceleration sensation presentation apparatus according to any one of (9) to (12), further including: a speaker configured to output predetermined audio, wherein the playing unit transmits an audio signal supplied via a network to the speaker.

(14) The acceleration sensation presentation apparatus according to any one of (9) to (13), further including: a sensor configured to detect a motion of the user is provided to a predetermined location of the frame, wherein the playing unit corrects the acceleration information according to sensor information obtained by the sensor, and supplies a driving signal based on the acceleration information after correction to the vibration driving unit.

(15) The acceleration sensation presentation apparatus according to any one of (9) to (14), further including: a fan configured to provide wind pressure to the user, wherein the fan is driven according to a fan driving signal obtained based on the acceleration information.

(16) An acceleration sensation presentation method of an acceleration sensation presentation apparatus which is provided to a frame to be worn on the head of a user; wherein at least one or more weights to be moved are vibrated.

(17) An acceleration sensation presentation system including: an external device configured to output acceleration information in a synchronized manner with a predetermined video signal and a predetermined audio signal; and an acceleration sensation presentation apparatus configured to obtain the acceleration information, wherein the acceleration sensation presentation apparatus includes a frame to be worn on the head of a user, at least one or more weights provided to the frame, and a vibration driving unit configured to vibrate the weight to be moved, based on the acceleration information.

(18) The acceleration sensation presentation system according to (17), wherein the external device is at least one of: an imaging apparatus; a riding device including an imaging apparatus; a riding device to be remotely controlled; a robot to be remotely controlled; a model to be remotely controlled; and a gaming machine configured to execute a game program.

It should be understood by those skilled in the art that various modifications, combinations, sub-combinations and alterations may occur depending on design requirements and other factors insofar as they are within the scope of the appended claims or the equivalents thereof.

What is claimed is:

1. An acceleration sensation device, comprising:
 a frame to be worn by a user;
 at least one weight configured to be provided on the frame;
 a vibration driving unit configured to vibrate the at least one weight to be moved; and
 a playing unit configured to:
  receive acceleration information; and
  supply a driving signal to the vibration driving unit based on the received acceleration information.

2. The acceleration sensation device according to claim 1, wherein the vibration driving unit is further configured to vibrate the at least one weight based on the driving signal.

3. The acceleration sensation device according to claim 1, wherein a center of gravity of the acceleration sensation device is configured to be changed based on movement of the at least one weight, wherein the center of gravity is determined based on a position of the at least one weight.

4. The acceleration sensation device according to claim 1, wherein the frame includes:
 a base frame configured to be worn on at least a portion of a head of the user;
 an arc-shaped first turning frame configured to be fixed to the base frame, wherein the arc-shaped first turning frame is further configured to turn on a first axis which extends in a first direction, and wherein the first direction is an optical radial direction of the base frame; and
 an arc-shaped second turning frame configured to be fixed to the base frame, wherein the arc-shaped first turning frame is further configured to turn on a second axis, and wherein the second axis extends in a second direction orthogonal to the first direction.

5. The acceleration sensation device according to claim 4, wherein the at least one weight includes:
 a first weight configured to be fixed to a first top portion of the arc-shaped first turning frame; and
 a second weight configured to be fixed to a second top portion of the arc-shaped second turning frame,
and wherein the vibration driving unit includes:
 a first vibration driving unit configured to vibrate the first weight; and
 a second vibration driving unit configured to vibrate the second weight.

6. The acceleration sensation device according to claim 5, wherein the frame further includes:
 a third turning frame configured to turn on the second axis which extends in the second direction, wherein a first movable range of the third turning frame is configured to be different from a second movable range of the arc-shaped second turning frame,
wherein the at least one weight further includes:
 a third weight configured to be fixed to a third top portion of the third turning frame and
wherein the vibration driving unit further includes:
 a third vibration driving unit configured to vibrate the third weight.

7. The acceleration sensation device according to claim 1, further comprising:
 a first elongated slide hole configured to be provided to an arc-shaped first turning frame of the frame; and
 a second elongated slide hole configured to be provided to an arc-shaped second turning frame of the frame,
 wherein the at least one weight is further configured to be inserted into the first elongated slide hole and the second elongated slide hole at a position where the arc-shaped first turning frame and the arc-shaped second turning frame cross, and
 wherein the at least one weight is configured to slide along at least one of the first elongated slide hole or the second elongated slide hole.

8. The acceleration sensation device according to claim 1, further comprising:
 a movement driving unit configured to move the at least one weight.

9. The acceleration sensation device according to claim 1, wherein the driving signal is configured to be set to increase a magnitude of vibration of the at least one weight based on a change in the received acceleration information that is greater than a threshold.

10. The acceleration sensation device according to claim 1, wherein the received acceleration information is supplied to the playing unit via a network.

11. The acceleration sensation device according to claim 1, further comprising:
 a head-mounted display configured to display a video,
 wherein the playing unit is further configured to transmit a video signal to the head-mounted display, wherein the video signal is supplied to the playing unit via a network.

12. The acceleration sensation device according to claim 1, further comprising:
 a speaker configured to output an audio,
 wherein the playing unit is further configured to transmit an audio signal to the speaker, wherein the audio signal is supplied to the playing unit via a network.

13. The acceleration sensation device according to claim 1, further comprising:
 a sensor configured to detect a motion of the user, wherein the sensor is located on the frame,
 wherein the playing unit is further configured to:
  correct the received acceleration information based on sensor information obtained by the sensor; and
  supply the driving signal to the vibration driving unit based on the corrected received acceleration information.

14. The acceleration sensation device according to claim 1, further comprising:
 a fan configured to provide wind pressure to the user,
 wherein the fan is configured to be driven based on a fan driving signal, wherein the fan driving signal is determined based on the acceleration information.

15. An acceleration sensation method of an acceleration sensation device, the method comprising:
 supplying a driving signal based on acceleration information received by the acceleration sensation device; and
 vibrating at least one weight based on the driving signal, wherein the at least one weight is configured to be provided on a frame of the acceleration sensation device, wherein the frame is configured to be worn by a user.

16. An acceleration sensation system, comprising:
 an external device configured to output acceleration information in a synchronized manner with a video signal and an audio signal; and
 an acceleration sensation device configured to obtain the acceleration information from the external device, wherein the acceleration sensation device includes:
a frame to be worn by a user;
at least one weight configured to be provided on the frame;
a vibration driving unit configured to vibrate the at least one weight to be moved; and
a playing unit configured to supply a driving signal to the vibration driving unit based on the obtained acceleration information.

17. The acceleration sensation system according to claim 16, wherein the external device is at least one of
an imaging apparatus,
a riding device which includes the imaging apparatus,
a robot to be remotely controlled,
a model to be remotely controlled, or
a gaming machine configured to execute a game program.

18. A non-transitory computer-readable medium having stored thereon, computer-executable instructions for causing an acceleration sensation device to execute operations, the operations comprising:
supplying a driving signal based on acceleration information received by the acceleration sensation device; and
vibrating at least one weight based on the driving signal, wherein the at least one weight is configured to be provided on a frame of the acceleration sensation device, wherein the frame is configured to be worn by a user.

* * * * *